Patented Apr. 6, 1954

2,674,623

UNITED STATES PATENT OFFICE 2,674,623

MANUFACTURE OF 2,4,5-TRICHLOROPHENOXYACETIC ACID

Harold D. Orloff, Detroit, Mich., and James G. Jolly, Columbus, Ga., assignors to Ethyl Corporation, New York, N. Y., a corporation of Delaware No Drawing. Application November 28, 1952, Serial No. 323,158

7 Claims. (Cl. 260—521)

This invention relates to the manufacture of 2,4,5-trichlorophenoxyacetic acid (2,4,5-T), and more particularly to a new and improved process for rendering technical 2,4,5-T colorless and in a form acceptable for marketing.

2,4,5-T is of growing importance as a herbicide. It is particularly efficacious when used for the control of woody growths such as the mesquite bush of the southwestern United States. 2,4,5-T may be applied for herbicidal use as the free acid or as a salt, ester, etc.

2,4,5-T is prepared commercially by reaction of 2,4,5-trichlorophenol with chloroacetic acid, these materials condensing to produce a molecule of 2,4,5-T and a molecule of sodium chloride. This reaction is usually carried out in aqueous medium and in the presence of an alkali such as sodium hydroxide which effects the condensation reaction. When 2,4,5-T is made in this fashion, the technical product obtained usually does not meet with commercial acceptance due to the presence of impurities. The impurities cause the technical product to have a lowered melting point and a color varying from tan to a deep brown. The exact nature of these impurities is not known at this time. However, it is believed that they are aryloxyacetic acids other than 2,4,5-T and that they arise from the presence of phenolic impurities in the 2,4,5-trichlorophenol starting material. A means of purifying technical 2,4,5-T, therefore, to a product of acceptable melting point and a white or near white color would be highly desirable to 2,4,5-T producers.

An object of the present invention is to provide a new and improved means for purifying 2,4,5-T. An additional object is to provide a new and improved method for the conversion of technical 2,4,5-T to a product of acceptable melting point and a white or very nearly white color. Other objects will be apparent from the following description of our invention.

We have now found that 2,4,5-T of acceptable melting point and a white or nearly white color can be made from low melting, dark, technical 2,4,5-T by recrystallizing the technical material from a low-polarity solvent in the presence of a selective adsorbent for the colored impurities. By use of this invention, 2,4,5-T of good melting point and good color can be obtained, even from a deep brown and very low melting technical material.

We have further discovered that the nature of the adsorbent used is critical. The adsorbent with which the technical 2,4,5-T being treated is contacted should be an acid-treated bentonite type clay. Bentonite has been defined as an earthy unconsolidated deposit consisting chiefly of montmorillonite minerals. The montmorillonite type minerals include a group of hydrous alumina-silica materials with which are combined chemically certain amounts of more electropositive ions, such as alkali or alkaline earth metal ions. Among the members of the montmorillonite mineral family are montmorillonite itself, a hydrous aluminum silicate containing chemically combined magnesium or sodium; nontronite, a montmorillonite type material containing ferric and sodium or aluminum ion; hectonite, containing lithium or sodium ion; and saponite containing positive magnesium ion plus positive aluminum or sodium ion. Bentonite may contain major amounts of any of the above montmorillonite type minerals.

Acid treatment of bentonite clays is usually accomplished by slurrying the clay with water and adding mineral acid to the extent of about 35 per cent of the weight of clay being treated. The acidified slurry is treated with steam at about 200° F. for an extended period of time, i. e. 5 to 6 hours. The mixture is then diluted with water, washed with additional water, filtered, and dried to the desired water content. See Kirk and Othmer "Encyclopedia of Chemical Technology," The Interscience Encyclopedia, Inc., New York, volume 4, pages 24–56, 1949. Such acid-treated bentonite clays are commercially available under the trade name of "Filtrols."

We have found that other types of adsorbents, such as activated carbon, fuller's earth, diatomaceous earth, silica gel, and activated alumina, fail to give a color improvement or melting point improvement when used in our invention. Apparently, therefore, the advantages that we get are due to the particular chemical nature of the acid-treated bentonite clay adsorbent.

As the recrystallization solvent, any low-polarity solvent which has an appreciable solubility for 2,4,5-T when hot, but a limited solubility for 2,4,5-T in the cold, is suitable. Hydrocarbons and halogenated hydrocarbons generally have these properties and thus are preferred for use in our invention. Examples of some of our preferred solvents include paraffin hydrocarbons, such as normal heptane, normal octane, normal decane, isooctane, and the like; olefins, such as normal decene, cyclohexene, diisobutylene, pinene, and the like; cycloparaffins, such as cyclohexane, methyl cyclohexane, etc.; petroleum distillates, such as kerosene and solvent naphtha; aromatic hydrocarbons, such as benzene, toluene, xylenes, cumene, ethyl benzene, mesitylene; and halogenated hydrocarbons, such as chlorocyclohexane, amyl chlorides, carbon tetrachloride, chloroform, perchloroethylene, trichloroethylene, ethylene dichloride, chlorobenzene, orthodichlorobenzene, acetylene tetrachloride, trichlorobenzenes, propylene dichloride, bromobenzene, halogenated toluenes, liquid mixtures of dichlorobenzenes, etc. We find that most beneficial results are obtained with aromatic hydrocarbons and chlorinated hydrocarbons, particularly chlorobenzene and toluene. Mixtures of the above solvents may be employed with good results.

The amount of solvent used will vary with the particular solvent chosen. As stated above, the solvent should be one having an appreciable solubility for 2,4,5-T when hot, but a limited solubility for 2,4,5-T in the cold. Generally solvent-to-2,4,5-T ratios of from about 1 to 1 to about 10 to 1 have proven very satisfactory. The above ratios are in terms of volume of solvent to weight of technical 2,4,5-T.

In practicing our invention technical 2,4,5-T is contacted with a solvent of the type described above in a ratio such that the 2,4,5-T is substantially not in solution at lower temperatures, such as room temperature and thereabouts, but is substantially all dissolved at higher temperatures, such as the boiling point of the solution. Adsorbent may be added while the mixture of 2,4,5-T and solvent is either at the lower temperature range or the higher temperature range or at an intermediate temperature. The mixture of 2,4,5-T and solvent is heated to a temperature at which the 2,4,5-T is all in solution, preferably with mechanical agitation. The mixture is then filtered while hot to remove incidental impurities such as dust and the like, then crystallized at a temperature at which most of the 2,4,5-T does not remain in solution. The recrystallized 2,4,5-T is then separated from the mother liquor by conventional means, such as centrifugation, filtration, decantation, and the like. The mother liquor then may be recycled to further recrystallizations if desired.

The following examples will illustrate the benefits to be obtained by use of our invention.

*Example I*

A sample of 2,4,5-T of a brown color and melting point 145-149° C. was recrystallized from monochlorobenzene in the ratio of two parts by volume of monochlorobenzene to one part by weight of crude 2,4,5-T. The mixture was brought to a temperature of 120° C. and filtered while hot. It was treated with acid-treated bentonite in the amount of one per cent of the weight of 2,4,5-T originally used. The material was then cooled to a temperature of 35° C. and held at this temperature for a period of 15 minutes, at the end of which time the recrystallized material was separated from the mother liquor by filtration. The recrystallized material was of a fawn color and had a melting point of 151-153° C. The melting point of pure 2,4,5-T has been reported as 153° C. The recovery of 2,4,5-T was 92 per cent of the amount treated, with additional quantities of purified material having crystallized on various inaccessible surfaces of the equipment used.

*Example II*

The procedure of Example I was followed except that the amount of acid-treated bentonite used was 5 per cent of the weight of 2,4,5-T treated. The cream colored product had a melting point of 152-154° C.

*Example III*

The procedure of Example I was repeated except that no acid-treated bentonite was added to the recrystallization product. The product obtained was a "medium brown" color and had a melting point of only 147-151° C.

*Example IV*

In the manner described in Example I, crude 2,4,5-T of brown color and having a melting point of 145-149° C. was crystallized from toluene in the ratio of two parts by volume of toluene by part per weight of 2,4,5-T and in the presence of one per cent of acid-treated bentonite based on the weight of 2,4,5-T treated. A fawn colored material of melting point 150-153° C. was obtained in recovery of 92 per cent.

*Example V*

Example IV was repeated except that the amount of acid-treated bentonite added was 5 per cent based on the weight of 2,4,5-T treated. The product was of a cream color and had a melting point of 152-154° C. The recovery was 92 per cent.

*Example VI*

The procedure of Example IV was repeated except that the solvent was a mixture of trichlorobenzenes. The fawn colored product had a melting point of 151-153° C. and was obtained in 92 per cent recovery.

Other low-polarity solvents, such as carbon tetrachloride, acetylene tetrachloride, orthodichlorobenzene, cyclohexane, ethyl benzene, cyclohexane, and the like, can be used in the above procedures with substantially identical results. Other ratios of solvent to 2,4,5-T may be used as long as the ratios chosen allow essentially complete solubility of 2,4,5-T in the hot solvent and considerably reduced solubility in the cold solvent.

As stated above, the upper temperature of crystallization may be any temperature which the 2,4,5-T is completely soluble in the amount of solvent chosen. Conveniently, this temperature may be at or near the boiling point of the particular solvent; it can also be below this boiling point or, when a pressure-type operation is used, can be considerably above the boiling point of the solvent or the solution. With most of our preferred solvents the upper temperature will lie between 80 and 150° C. Also, there is considerable latitude in choice of lower or crystalilzation temperatures, and any temperature at which a portion of the 2,4,5-T is insoluble in the amount of solvent used is satisfactory. However, for optimum recoveries it is generally desirable to use as low a temperature as possible, as long as this temperature still permits the existence of a 2,4,5-T crystal phase and a mother liquor phase in amount capable of mechanical separation and at the same time avoids excessive refrigeration requirements. Temperatures of 0 to 50° C. are suitable with most of our preferred solvents.

The amount of acid-treated bentonite can vary over a fairly wide range, as illustrated above. As little as one per cent acid-treated bentonite based on the weight of 2,4,5-T treated can be used, although better results are obtained with the use of higher amounts, as can be seen by the above examples employing 5 per cent acid-treated bentonite. Even greater benefits can be obtained when even higher amounts of acid-treated bentonite, such as about 10 per cent of the weight of 2,4,5-T treated are employed. Beyond this point, however, there is little gain in proportion to the extra amount of acid-treated bentonite used.

In order to more completely and graphically point out the significance of our invention the following examples illustrate contrasting results obtained when other adsorbents are used.

*Example VII*

Using the procedure of Example I, the following adsorbents were used in conjunction with solvents similar to those illustrated above: "Norit" activated charcoal, fuller's earth, silica gel, activated alumina, and diatomaceous earth. The recrystallized 2,4,5-T in each case showed essentially no lightening in color or improvement in melting point over the technical material charged to the recrystallization operation.

In contrast to the good results demonstrated in the use of our invention, the following example illustrates the poor results obtained when using solvents of high-polarity in our process.

*Example VIII*

Using the procedure of Example I, except that n-butyl acetate was used as the solvent, a batch of technical 2,4,5-T was recrystallized. Although there was a significant improvement in color and melting point in the recrystallized product, less than half of the starting material was recovered as a recrystallized product. Other high-polarity solvents yield correspondingly low recoveries of 2,4,5-T.

We claim:

1. A process for producing 2,4,5-trichlorophenoxyacetic acid of high melting point and light color, comprising dissolving technical 2,4,5-trichlorophenoxyacetic acid of low melting point and relatively dark color in a low-polarity solvent adding an acid-treated bentonite clay to the solution, filtering the mixture and crystallizing from the filtrate a purified 2,4,5-trichlorophenoxyacetic acid.

2. Process of claim 1 in which the low-polarity solvent is a chlorohydrocarbon.

3. Process of claim 1 in which the clay is present in amounts corresponding to 1 to 10 per cent by weight of the amount of technical 2,4,5-trichlorophenoxyacetic acid treated.

4. Process of claim 1, in which the low-polarity solvent is monochlorobenzene.

5. Process of claim 1, in which the low-polarity solvent is a hydrocarbon.

6. Process of claim 1, in which the low-polarity solvent is toluene.

7. A process for producing 2,4,5-trichlorophenoxyacetic acid of high melting point and light color comprising treating a mixture of substantially one part by weight of 2,4,5-trichlorophenoxyacetic acid and two parts by volume of monochlorobenzene at a temperature of about 120° C. with acid-treated bentonite clay in amount of about 1 weight per cent based on the amount of 2,4,5-trichlorophenoxyacetic acid treated, filtering the mixture, cooling the filtrate to a temperature of about 35° C. to cause precipitation of purified 2,4,5-trichlorophenoxyacetic acid, and removing said purified 2,4,5-trichlorophenoxyacetic acid from its mother liquor.

References Cited in the file of this patent

UNITED STATES PATENTS

| Number | Name | Date |
|---|---|---|
| 2,602,091 | Dosser et al. | July 1, 1952 |

FOREIGN PATENTS

| Number | Country | Date |
|---|---|---|
| 573,510 | Great Britain | Nov. 23, 1945 |
| 443,701 | Italy | Jan. 3, 1949 |

OTHER REFERENCES

Deribere, Chem. Abstracts, vol. 37, col. 3863 (1943).

Uyeno et al., Chem. Abstracts, vol. 41, col. 3308 (1947).

Arcuri, Chem. Abstracts, vol. 44, cols. 11049–11050 (1950).